US012795429B2

(12) United States Patent
Taheri et al.

(10) Patent No.: US 12,795,429 B2
(45) Date of Patent: *Nov. 10, 2026

(54) CLEANING RAW DATA GENERATED BY A TELECOMMUNICATIONS NETWORK FOR DEPLOYMENT IN A DEEP NEURAL NETWORK MODEL

(71) Applicant: VIAVI Solutions Inc., Chandler, AZ (US)

(72) Inventors: Sayed Taheri, Cheshire (GB); Faris Muhammad, Edgware (GB); Hamed Al-Raweshidy, New Denham (GB); Srini Challa, Hatfield (GB)

(73) Assignee: VIAVI Solutions Inc., Chandler, AZ (US)

( * ) Notice: Subject to any disclaimer, the term of this patent is extended or adjusted under 35 U.S.C. 154(b) by 330 days.

This patent is subject to a terminal disclaimer.

(21) Appl. No.: 18/595,657

(22) Filed: Mar. 5, 2024

(65) Prior Publication Data

US 2024/0205721 A1 Jun. 20, 2024

Related U.S. Application Data

(63) Continuation of application No. 17/492,144, filed on Oct. 1, 2021, now Pat. No. 11,950,122.

(51) Int. Cl.
*H04W 24/10* (2009.01)
*G06F 18/21* (2023.01)
(Continued)

(52) U.S. Cl.
CPC .......... *H04W 24/10* (2013.01); *G06F 18/214* (2023.01); *G06F 18/217* (2023.01);
(Continued)

(58) Field of Classification Search
CPC ..... H04W 24/10; H04W 24/08; G06F 18/214; G06F 18/217; G06F 40/143;
(Continued)

(56) References Cited

U.S. PATENT DOCUMENTS 11,620,473 B1 * 4/2023 Zhang .................. G06F 18/213 382/159
2013/0014138 A1 1/2013 Bhatia et al.
(Continued)

FOREIGN PATENT DOCUMENTS

KR 102194962 B1 12/2020

OTHER PUBLICATIONS

Extended European Search Report for European Application No. EP241949379 dated Nov. 14, 2024, 5 pages.
(Continued)

*Primary Examiner* — Cheikh T Ndiaye
(74) *Attorney, Agent, or Firm* — Harrity & Harrity, LLP

(57) ABSTRACT

A device may receive software logs identifying raw data and may convert the raw data to a text format, to generate text data. The device may extract pre-log data from the text data and may remove files with less than a threshold quantity of lines from the text data to generate modified text data. The device may extract UE data from the modified text data and may decode RRC messages in the modified text data to generate decoded RRC messages. The device may extract marker data from the modified text data and may remove files associated with timestamps and test cases from the modified text data to generate further modified text data. The device may extract test case data from the further modified text data and may generate final data that includes the pre-log data, the UE data, the decoded RRC messages, the marker data, and the test case data.

20 Claims, 13 Drawing Sheets

(51) Int. Cl.

| | |
|---|---|
| ***G06F 18/214*** | (2023.01) |
| ***G06F 40/143*** | (2020.01) |
| ***G06F 40/289*** | (2020.01) |
| ***G06N 3/04*** | (2023.01) |
| ***G06N 3/08*** | (2023.01) |
| ***H04W 24/08*** | (2009.01) |

(52) U.S. Cl.
CPC .......... *G06F 40/143* (2020.01); *G06F 40/289* (2020.01); *G06N 3/04* (2013.01); *G06N 3/08* (2013.01); *H04W 24/08* (2013.01)

(58) Field of Classification Search
CPC ......... G06F 40/289; G06F 16/84; G06N 3/04; G06N 3/08; H04L 41/147; H04L 41/16; H04L 43/50
See application file for complete search history.

(56) References Cited

U.S. PATENT DOCUMENTS

| | | | | |
|---|---|---|---|---|
| 2020/0162336 | A1 | 5/2020 | Gonguet | |
| 2021/0281592 | A1* | 9/2021 | Givental | G06N 20/10 |
| 2021/0366287 | A1 | 11/2021 | Lee | |
| 2022/0358149 | A1* | 11/2022 | Frank | G06N 5/022 |
| 2023/0107148 | A1 | 4/2023 | Taheri et al. | |

OTHER PUBLICATIONS

Extended European Search Report for Application No. EP22183073.0 mailed on Dec. 16, 2022, 7 pages.

* cited by examiner

CLEANING RAW DATA GENERATED BY A TELECOMMUNICATIONS NETWORK FOR DEPLOYMENT IN A DEEP NEURAL NETWORK MODEL

RELATED APPLICATION

This application is a continuation of U.S. patent application Ser. No. 17/492,144, filed Oct. 1, 2021, which is incorporated herein by reference in its entirety.

BACKGROUND

Fifth generation (5G) telecommunications networks provide the latest telecommunications wireless technology. A 5G telecommunications network incorporates and deploys a variety of techniques in the field of wireless and mobile communications, such as cognitive radio, three-dimensional beamforming, millimeter-wave (mmWave), a massive multiple-input multiple-output (m-MIMO) architecture, and/or the like.

SUMMARY

Some implementations described herein relate to a method. The method may include receiving software logs identifying raw data generated by a telecommunications network and converting the raw data from a markup language format to a text format, to generate text data. The method may include changing name strings of the text data to a new name, and extracting pre-log data, associated with test cases, from the text data. The method may include removing files with less than a threshold quantity of lines from the text data to generate modified text data, and extracting user equipment (UE) data, associated with a particular quantity of UEs, from the modified text data. The method may include decoding radio resource control (RRC) messages in the modified text data to generate decoded RRC messages, and extracting marker data, associated with particular markers, from the modified text data. The method may include removing files associated with timestamps and a first set of the test cases from the modified text data to generate further modified text data, and extracting test case data, associated with a second set of the test cases, from the further modified text data. The method may include generating final data with the new name and including the pre-log data, the UE data, the decoded RRC messages, the marker data, and the test case data, and training a deep neural network (DNN) model with the final data to generate a trained DNN model.

Some implementations described herein relate to a device. The device may include one or more memories and one or more processors coupled to the one or more memories. The one or more processors may be configured to receive software logs identifying raw data generated by a telecommunications network and convert the raw data from a markup language format to a text format, to generate text data. The one or more processors may be configured to change name strings of the text data to a new name, and extract pre-log data, associated with test cases, from the text data. The one or more processors may be configured to remove files with less than a threshold quantity of lines from the text data to generate modified text data, and extract UE data, associated with a particular quantity of UEs, from the modified text data. The one or more processors may be configured to decode RRC messages in the modified text data to generate decoded RRC messages, and extract marker data, associated with particular markers, from the modified text data. The one or more processors may be configured to remove files associated with timestamps and a first set of the test cases from the modified text data to generate further modified text data and remove delimiters from the further modified text data. The one or more processors may be configured to extract test case data, associated with a second set of the test cases, from the further modified text data, and generate final data with the new name and including the pre-log data, the UE data, the decoded RRC messages, the marker data, and the test case data. The one or more processors may be configured to perform one or more actions based on the final data.

Some implementations described herein relate to a non-transitory computer-readable medium that stores a set of instructions for a device. The set of instructions, when executed by one or more processors of the device, may cause the device to receive software logs identifying raw data generated by a telecommunications network, and convert the raw data from a markup language format to a text format, to generate text data. The set of instructions, when executed by one or more processors of the device, may cause the device to change name strings of the text data to a new name, and extract pre-log data, associated with test cases, from the text data. The set of instructions, when executed by one or more processors of the device, may cause the device to remove files with less than a threshold quantity of lines from the text data to generate modified text data, and extract UE data, associated with a particular quantity of UEs, from the modified text data. The set of instructions, when executed by one or more processors of the device, may cause the device to decode RRC messages in the modified text data to generate decoded RRC messages, and extract marker data, associated with particular markers, from the modified text data. The set of instructions, when executed by one or more processors of the device, may cause the device to remove files associated with timestamps and a first set of the test cases from the modified text data to generate further modified text data, and extract test case data, associated with a second set of the test cases, from the further modified text data. The set of instructions, when executed by one or more processors of the device, may cause the device to generate final data with the new name and including the pre-log data, the UE data, the decoded RRC messages, the marker data, and the test case data, and perform one or more actions based on the final data.

DETAILED DESCRIPTION

Figure 1A:
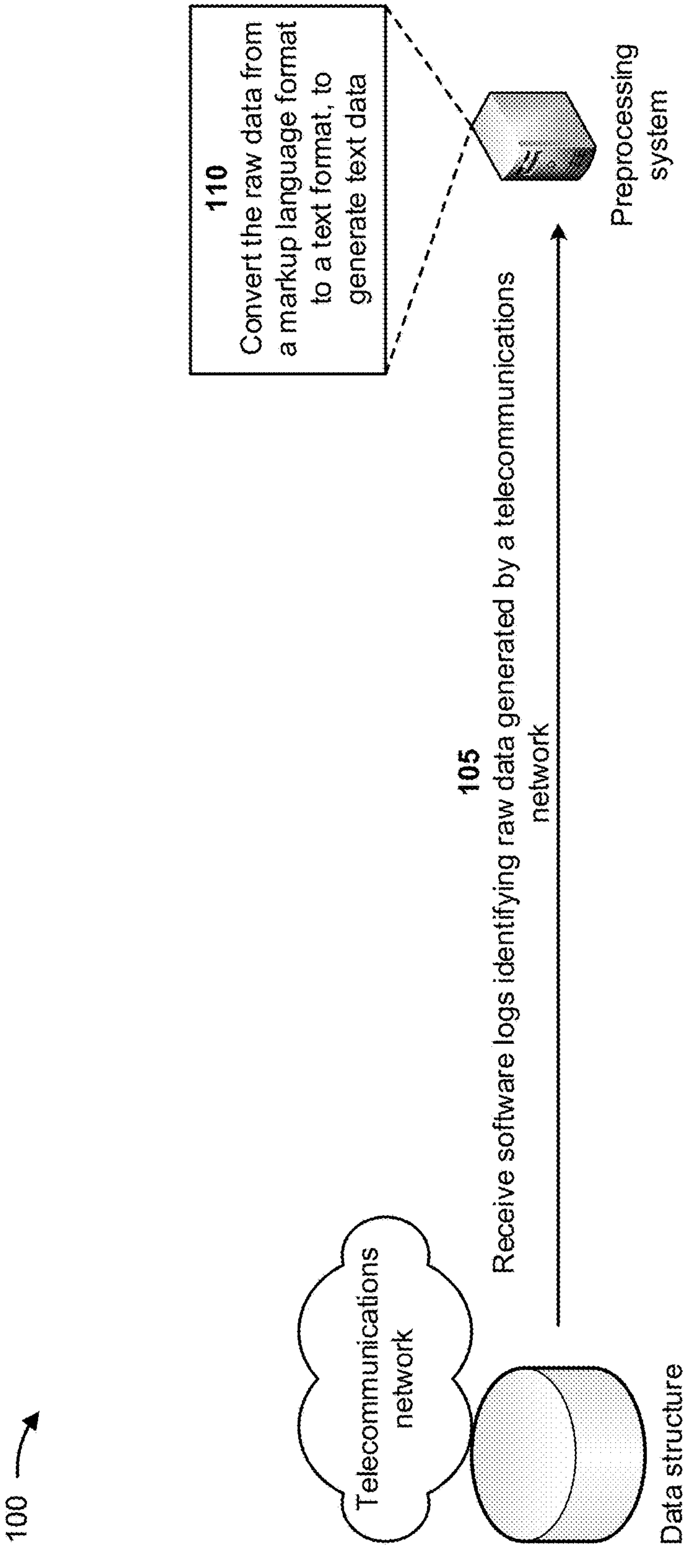
FIGS. 1A-1J are diagrams of an example implementation described herein.

The following detailed description of example implementations refers to the accompanying drawings. The same reference numbers in different drawings may identify the same or similar elements.

Reliable 5G telecommunications network testing solutions play a vital role in the development and implementation of new 5G (and beyond) technologies before such technologies can be used by the wider public. Testing of a 5G telecommunications network generates large quantities of software logs that include significant amounts of information associated with network states, network responses, network status, interactions with the network, runtime information, performance of the network, and/or the like. The software logs may include millions of lines of coded and uncoded text that is not readily understandable by unskilled people. There are experts at telecommunications service providers that rely on extensive knowledge and experience to interpret the software logs. A log mining process is utilized for failure discovery and diagnosis, security, classification, prediction, and/or the like based on the software logs. The software logs are also a source of diagnosis when malfunctions occur. When a malfunction occurs, experts at a telecommunications service provider may analyze the software logs to diagnosis a cause the malfunction.

The current techniques for analyzing software logs are non-systematic, inefficient, and result in shortcomings and bottlenecks. Not only do the current techniques require allocation and consumption of a large quantity of resources on a repeated basis, but the current techniques also fail to utilize valuable historical data from past resolved cases. Therefore, current techniques for analyzing software logs consume computing resources (e.g., processing resources, memory resources, communication resources, and/or the like), networking resources, and/or the like associated with incorrectly analyzing the software logs, making incorrect modifications to the telecommunications network based on the incorrectly analyzed software logs, correcting the incorrect modifications to the telecommunications network, and/or the like.

Some implementations described herein relate to a preprocessing system that cleans raw data generated by a telecommunications network for deployment in a deep neural network model. For example, the preprocessing system may receive software logs identifying raw data generated by a telecommunications network and may convert the raw data from a markup language format to a text format to generate text data. The preprocessing system may change name strings of the text data to a new name and may extract pre-log data, associated with test cases, from the text data. The preprocessing system may remove files with less than a threshold quantity of lines from the text data to generate modified text data and may extract user equipment (UE) data, associated with a particular quantity of UEs, from the modified text data. The preprocessing system may decode radio resource control (RRC) messages in the modified text data to generate decoded RRC messages and may extract marker data, associated with particular markers, from the modified text data. The preprocessing system may remove files associated with timestamps and a first set of the test cases from the modified text data to generate further modified text data and may extract test case data, associated with a second set of the test cases, from the further modified text data. The preprocessing system may generate final data with the new name and including the pre-log data, the UE data, the decoded RRC messages, the marker data, and the test case data and may train a deep neural network (DNN) model with the final data to generate a trained DNN model.

In this way, the preprocessing system cleans raw data generated by a telecommunications network for deployment in a deep neural network model. The preprocessing system may preprocess raw data from software logs acquired from testing a telecommunications network. The preprocessing system may extract the software logs from a service provider's database and may perform batch preprocessing tasks to generate output data to be utilized by a deep neural network model. The output data may include unified clean data significantly and positively impacts performance of the deep neural network during training, testing, and deployment. The preprocessing system may handle different sizes of data, different quantities of data batches, and increasing volume of software logs data. The preprocessing system may also be modified to produce different categories of clean data. This, in turn, conserves computing resources, networking resources, and/or the like that would otherwise have been consumed in incorrectly analyzing the software logs, making incorrect modifications to the telecommunications network based on the incorrectly analyzed software logs, correcting the incorrect modifications to the telecommunications network, and/or the like.

FIGS. 1A-1J are diagrams of an example 100 associated with cleaning raw data generated by a telecommunications network for deployment in a deep neural network model. As shown in FIGS. 1A-1J, example 100 includes a data structure associated with a telecommunications network and a preprocessing system. The data structure may include a database, a table, a like, and/or the like that stores software logs. The telecommunications network may include a 5G telecommunications network. The preprocessing system may include a system that cleans raw data generated by the telecommunications network for deployment in a deep neural network model. Further details of the data structure and the preprocessing system are provided elsewhere herein.

As shown in FIG. 1A, and by reference number 105, the preprocessing system may receive software logs identifying raw data generated by the telecommunications network. For example, a testing system may perform tests on components of the telecommunications network. The testing of the telecommunications network generates large quantities of software logs that include significant amounts of raw data associated with network states, network responses, network status, interactions with the network, runtime information, performance of the network, and/or the like. The software logs may include millions of lines of coded and uncoded text that is not readily understandable by unskilled people. The software logs may include historical test cases as well as resolved and reported cases. Each entry within the software logs may include static fields and dynamic fields, often in free-form natural language text that cannot be readily understood. The static fields may include text that is not variable, remains unchanged during an occurrence of an event, and is related to an event type. The dynamic fields may include text that is variable, that differs from one case to another case, and may be assigned at run-time. A system configuration set by the service provider may determine a form and content of each software log entry associated with a logged event.

The testing system and/or the telecommunications network may store the software logs in the data structure. In some implementations, the data structure may be maintained and/or managed by a service provider associated with the telecommunications network. The preprocessing system may provide, to the data structure, a request for the software logs and may receive the software logs from the data structure based on the request. In some implementations, the preprocessing system may receive a path identifying a location of the software logs at initialization. The preprocessing system retrieve the software logs from the identified path and may process the software logs in either a mini-batch mode or a full-batch mode. The mini-batch mode may enable the preprocessing system to specify a quantity of test case data associated with a release to be retrieved for processing by the preprocessing system. The full-batch mode may enable the preprocessing system to retrieve an entirety of data available.

As further shown in FIG. 1A, and by reference number 110, the preprocessing system may convert the raw data from a markup language format to a text format, to generate text data. For example, the raw data may be provided in a markup language format, such as hypertext markup language (HTML) format. The preprocessing system may convert the raw data from the markup language format to the text format (e.g., the text data) for further processing. The raw data may be converted or transformed into the text data, which is unified clean data that is compatible with a DNN model. The preprocessing system may not perform processing on the actual raw data. The preprocessing system may read the raw data from the data structure, may process the raw data, and may write new clean data to a data structure associated with the preprocessing system. In this way, the preprocessing system may ensure that the valuable actual raw data is still available for any future purposes.

In some implementations, the static fields, the dynamic fields, and elements of each within the software logs may be separated by a variety of delimiters, such as semicolons, commas, brackets, white space, next lines, and/or the like. The preprocessing system may eliminate the delimiters from the software logs so that the clean data may be processed by the DNN model. If the delimiters are not removed or replaced, performance of the DNN model may be reduced. Furthermore, if the delimiters are not removed, allocation of labelled data for training the DNN model may be much more challenging and less effective.

Figure 1B:
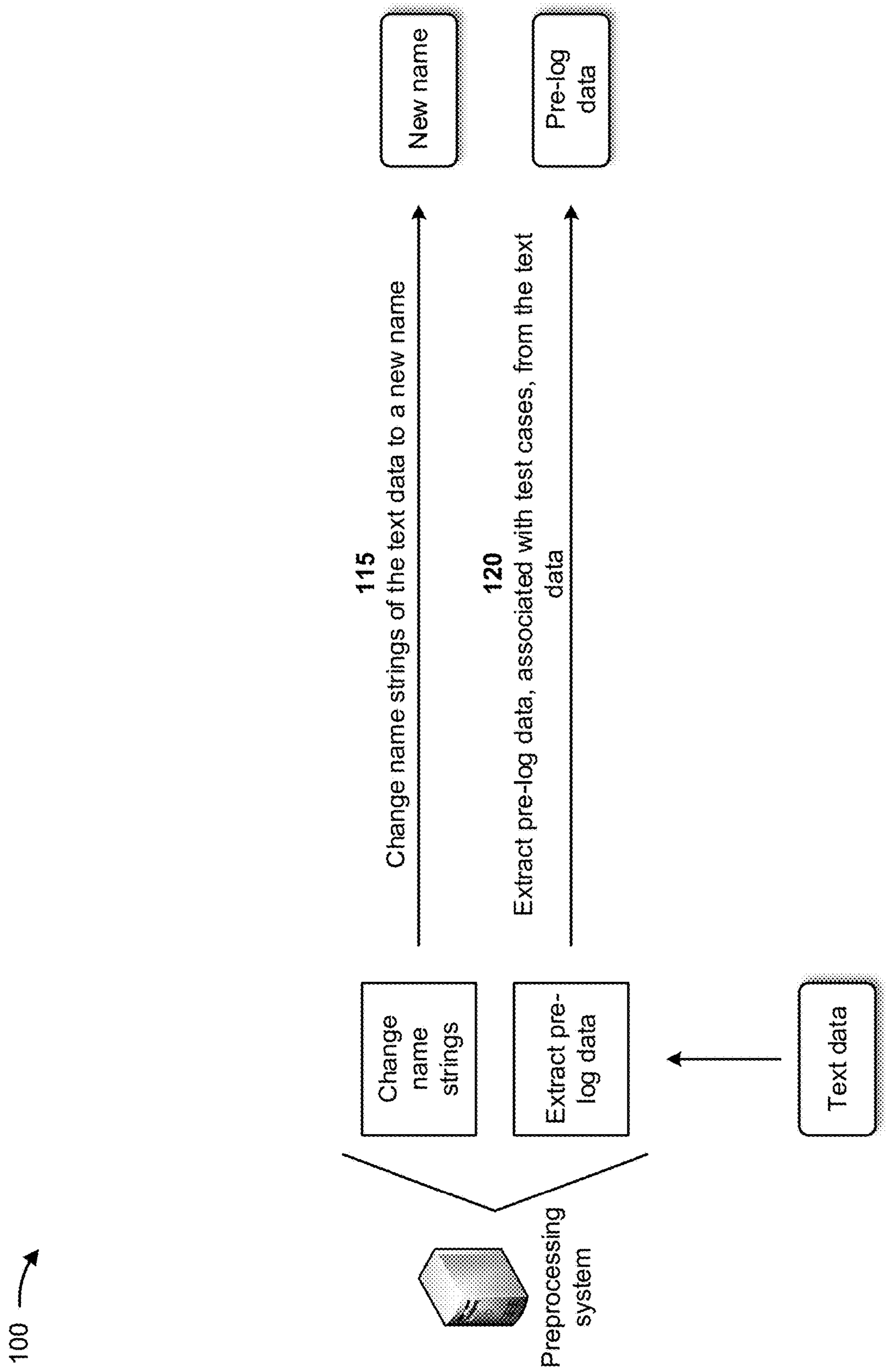

As shown in FIG. 1B, and by reference number 115, the preprocessing system may change name strings of the text data to a new name. For example, the preprocessing system may change name strings of the text data to the new name so that when processing of each software log is completed, the preprocessing system may assign the new name to each processed software log (e.g., a file name, such as "case number.txt") and may store the new name and the processed software log in a storage location (e.g., a data structure associated with the preprocessing system).

As further shown in FIG. 1B, and by reference number 120, the preprocessing system may extract pre-log data, associated with test cases, from the text data. For example, the pre-log data in the text data may include information to be utilized for analysis tasks by the DNN model. The pre-processing system may extract the pre-log data, associated with each test case, from the text data, and may add the pre-log data to beginnings of actual main software logs for each test case.

Figure 1C:
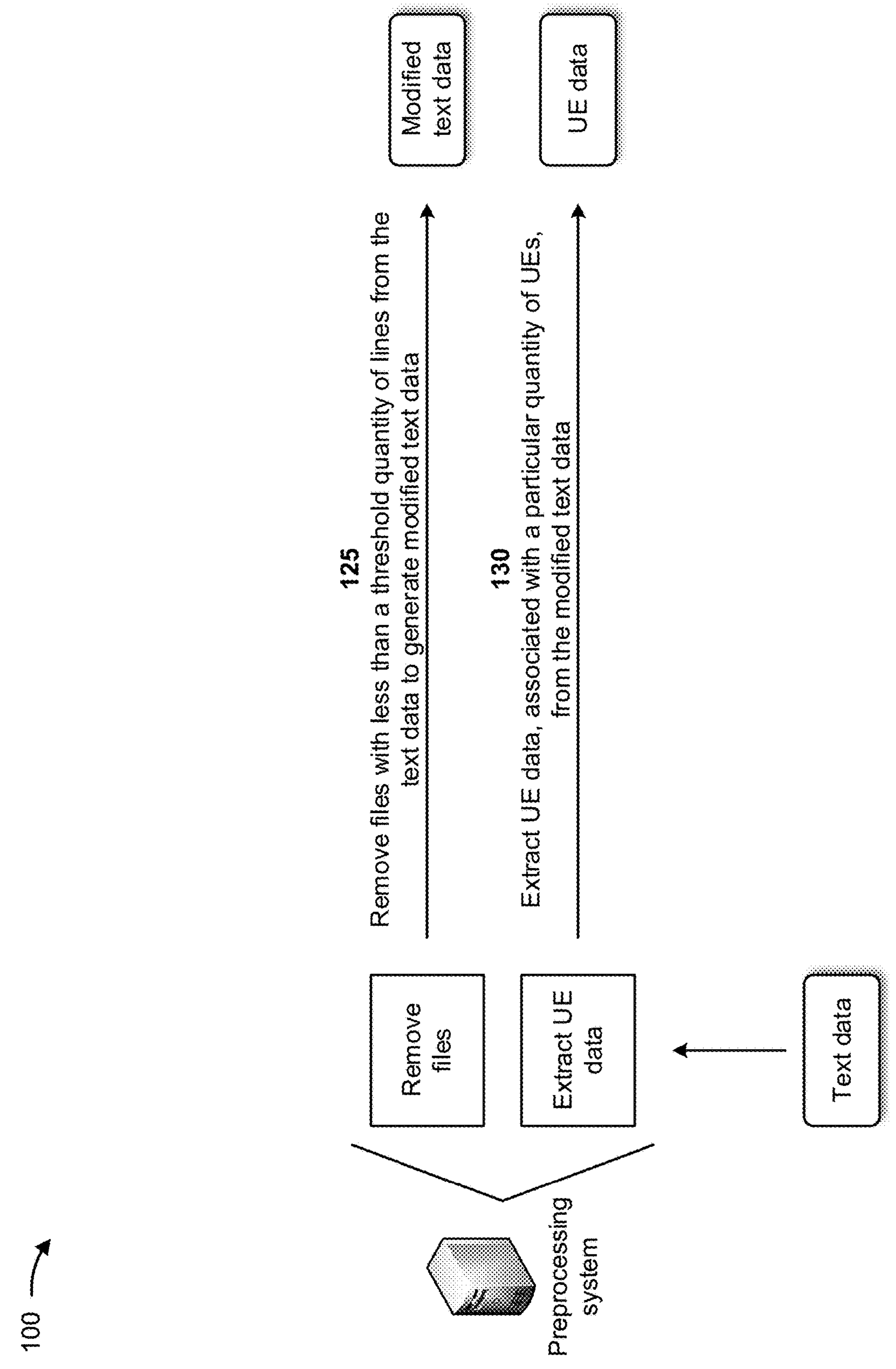

As shown in FIG. 1C, and by reference number 125, the preprocessing system may remove files with less than a threshold quantity of lines from the text data to generate modified text data. For example, while processing the text data, the preprocessing system may remove, from the text data, files with less than the threshold quantity of lines, to generate the modified text data (e.g., the text data without the files with less than the threshold quantity of lines). In some implementations, the threshold quantity may be one-hundred lines, one-hundred and fifty lines, two-hundred lines, and/or the like. The files with less than the threshold quantity of lines may include files associated with one or more of outliers, one or more aborted executions, one or more faulty codes, and/or the like. In this way, the preprocessing system may ensure that files associated with the outliers, the aborted executions, the faulty codes, and/or the like do not adversely impact the text data.

As further shown in FIG. 1C, and by reference number 130, the preprocessing system may extract UE data, associated with a particular quantity of UEs, from the modified text data. For example, the telecommunications network may provide telecommunications services to multiple UEs. The preprocessing system may identify, or be provided via user input, desired UE data associated with the particular quantity of UEs, of the multiple UEs. The preprocessing system may extract the desired UE data, associated with the particular quantity of UEs, from the modified text data. In this way, the preprocessing system may extract and process the desired UE data (e.g., single UE data or multiple UE data) and may filter out unwanted UE data.

Figure 1D:
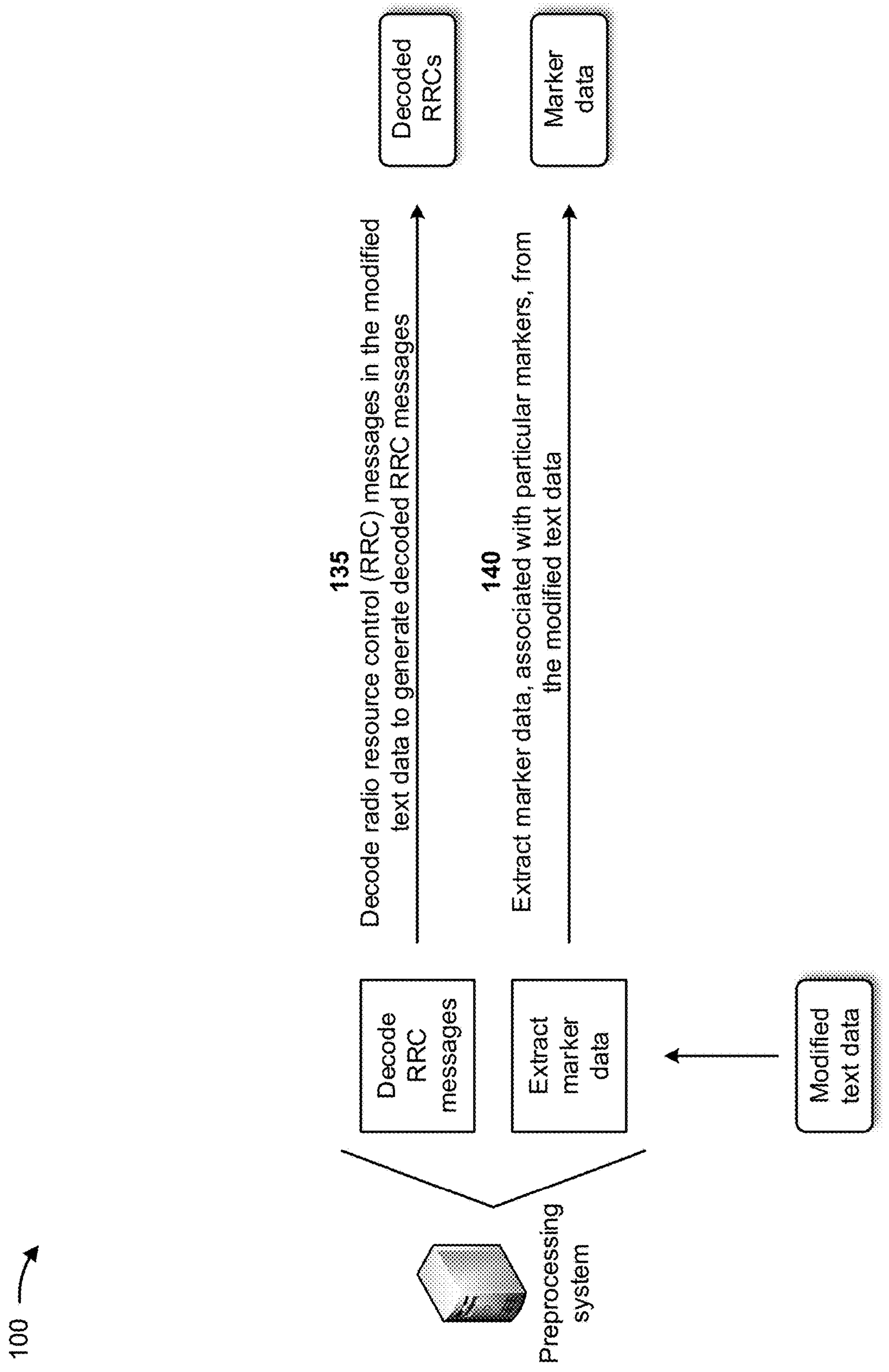

As shown in FIG. 1D, and by reference number 135, the preprocessing system may decode RRC messages in the modified text data to generate decoded RRC messages. For example, within each software log, there may exist RRC messages in a unified format (e.g., a hexadecimal format) that need to be decoded. The RRC messages may be located where protocol configuration options appear in the software logs. RRC is a protocol that is deployed in Long-Term Evolution (LTE) and fifth generation (5G) interfaces. The RRC messages are Layer 3 (L3) messages associated with a network layer protocol. In an Open System Interconnection (OSI) model, a gNodeB or a gNB may be a name for a base station. The preprocessing system may decode the RRC messages since the RRC messages include information that may be utilized to train the DNN model to perform particular tasks, such as perform a diagnosis. In one example, the preprocessing system may extract a protocol data unit (PDU) name and PDU codes from the RRC messages. If decoding is enabled, when the preprocessing system is initialized, the preprocessing system may decode a PDU hexadecimal, and may assign the decoded PDU hexadecimal to an associated PDU name.

In some implementations, when decoding the RRC messages in the modified text data to generate the decoded RRC messages, the preprocessing system may identify a decoder executable file in the modified text data, and the preprocessing system may utilize the decoder executable file to decode the RRC messages, in the modified text data, to generate the decoded RRC messages.

As further shown in FIG. 1D, and by reference number 140, the preprocessing system may extract marker data, associated with particular markers, from the modified text data. For example, the marker data may include data provided between the particular markers. The particular markers may include a request marker, a response marker, a test file marker, or an RRC cell selection marker, and/or the like. The preprocessing system may extract the marker data provided between the particular markers from the modified text data.

Figure 1E:
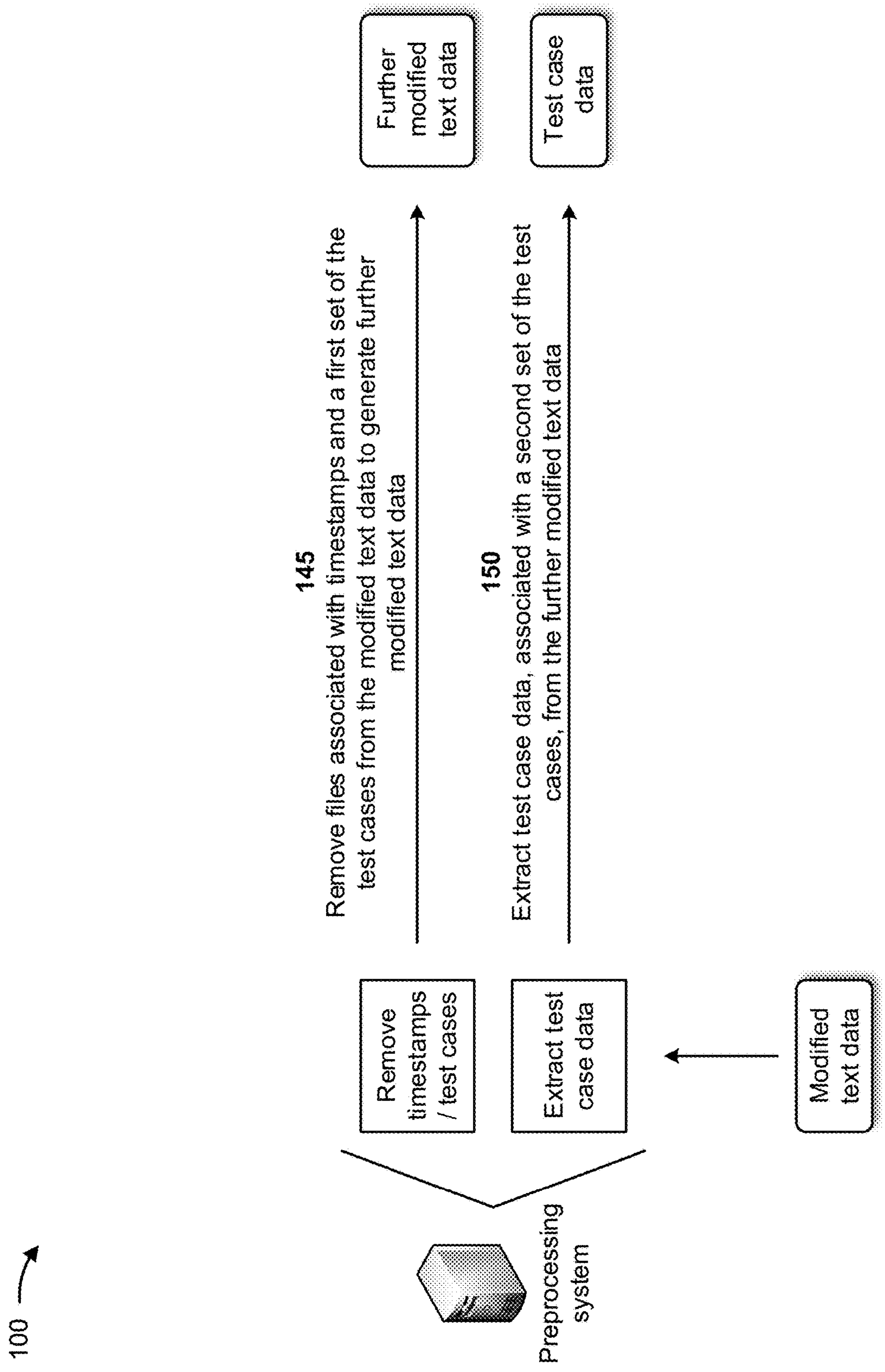

As shown in FIG. 1E, and by reference number 145, the preprocessing system may remove files associated with timestamps and a first set of the test cases from the modified text data to generate further modified text data. For example, the preprocessing system may remove, from the modified text data, files associated with test cases (e.g., the first set of the test cases) where particular keywords (e.g., begin, end, and/or stop) appear as the markers, files associated with forbidden test cases (e.g., test cases that require a particular quantity of hours (e.g., three hours, four hours, and/or the like) to complete). The preprocessing system may also remove, from the modified text data, files associated with the timestamps. The timestamps may be associated with event occurrences and may be detected by the preprocessing system when the preprocessing system is scanning through the software logs (e.g., within a batch or a mini-batch). The timestamps do not provide any meaningful information for training the DNN model and may be removed. The further modified text data may include the modified text data without the files associated with the timestamps and the first set of the test cases.

As further shown in FIG. 1E, and by reference number 150, the preprocessing system may extract test case data, associated with a second set of the test cases, from the further modified text data. For example, the second set of the test cases may include test cases associated with non-access stratum (NAS) modes and millimeter-wave (mmWave) transceiver system modes. The preprocessing system may extract such test cases from the further modified data.

In some implementations, the preprocessing system may remove, from the further modified text data, lines that include particular syntax. The particular syntax may include syntax indicating that a convert to text is completed, syntax identifying "python.exe," syntax indicating that a test executed and passed, syntax indicating that an action is waiting to be performed, and/or the like.

In some implementations, the preprocessing system may convert to a generalized format or completely remove dynamic fields (e.g., that are less informative for training the DNN model) from the text data. This may prevent the DNN model from expending a significant quantity of time and computational resources attempting to determine relationships between the dynamic fields and the rest of the text data. This may also prevent confusion of the DNN model during a training phase of the DNN model and poor performance during a test phase of the DNN model. The preprocessing system may analyze the text data to identify the dynamic fields in the text data. The preprocessing system may order the dynamic fields in a descending order based on occurrence frequency and may store the ordered dynamic fields in an output file. The preprocessing system may remove some or all of the dynamic fields from the output file. For example, the preprocessing system may remove, from the output file, dynamic fields that are less useful for a subject matter expert when conducting a triage and diagnosis process. The preprocessing system may review which dynamic fields are to be removed from the output file based on accuracies associated with training and testing of the DNN model. The preprocessing system may modify which of the dynamic fields are to be removed based the accuracy feedback.

In one example, the output file may include dynamic fields (e.g., with a quantity of occurrences and occurrence percentages (in parentheses)), such as I: 2386509 (4.43%), C: 1314075 (2.44%), HARQ: 1099280 (2.04%), startSymbolAndLength: 685524 (1.27%), mappingType: 685524 (1.27%), Cell: 654154 (1.21%), value: 642910 (1.19%), message: 610323 (1.13%), criticalExtensions: 598294 (1.11%), Throughput: 549826 (1.02%), k2: 468396 (0.87%), DL: 326028 (0.61%), UL: 312429 (0.58%), measId: 270608 (0.50%), rrc-TransactionIdentifier: 267221 (0.50%), nrofSymbols: 237518 (0.44%), pucch-ResourceId: 222944 (0.41%), format: 222944 (0.41%), startingSymbolIndex: 222944 (0.41%), startingPRB: 222944 (0.41%), periodicityAndOffset: 220892 (0.41%), rsrpResult: 217747 (0.40%), and/or the like. In such an example, the preprocessing system may determine that the following dynamic fields are to be removed from the output file: HARQ: 1099280 (2.04%), startSymbolAndLength: 685524 (1.27%), Cell: 654154 (1.21%), value: 642910 (1.19%), Throughput: 549826 (1.02%), DL: 326028 (0.61%), UL: 312429 (0.58%), startingPRB: 222944 (0.41%), periodicityAndOffset: 220892 (0.41%), rsrpResult: 217747 (0.40%), and/or the like.

Figure 1F:
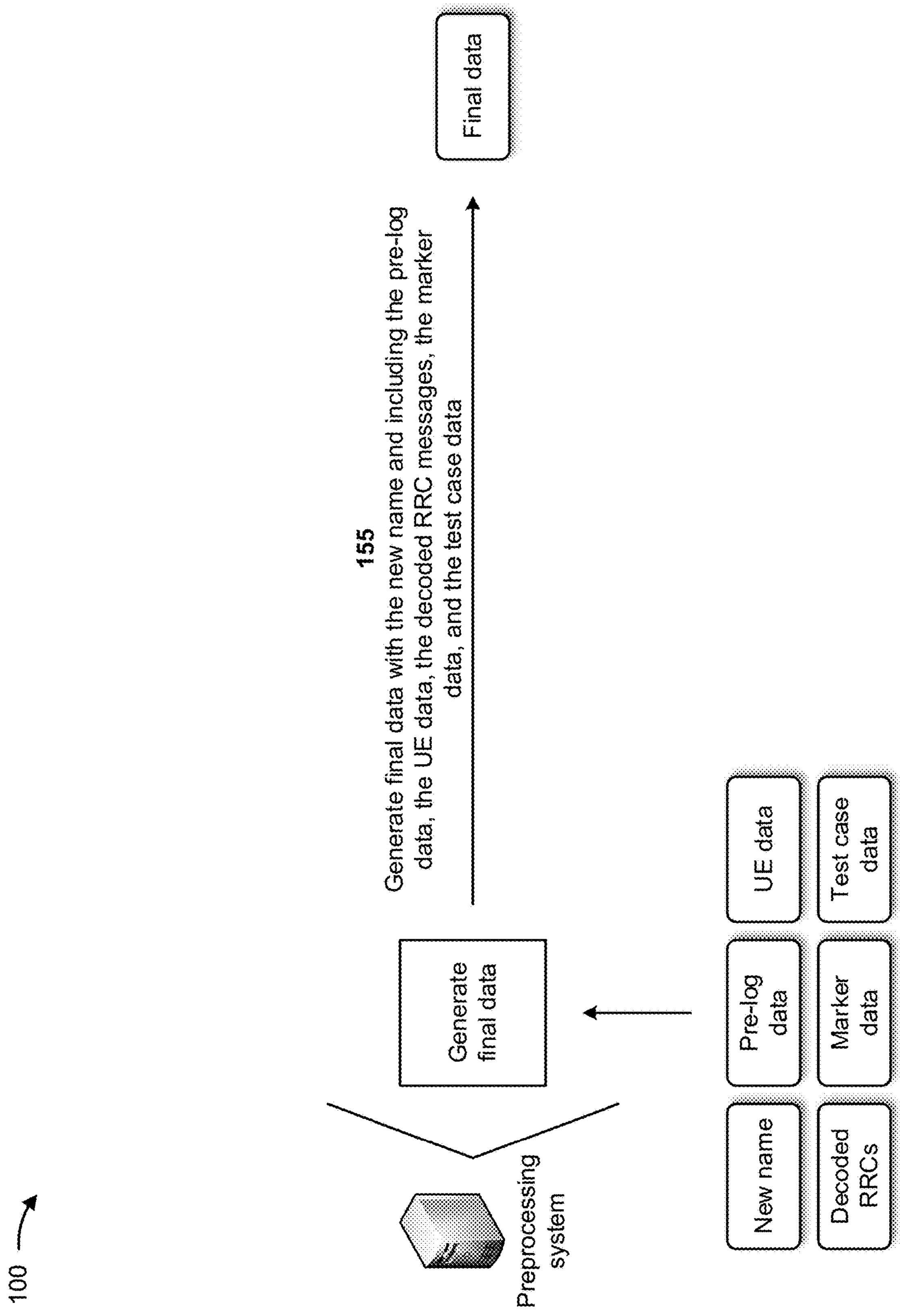

As shown in FIG. 1F, and by reference number 155, the preprocessing system may generate final data with the new name and including the pre-log data, the UE data, the decoded RRC messages, the marker data, and the test case data. For example, the preprocessing system may assign the new name to the final data and may store (e.g., in a data structure accessible to the DNN model) the final data with the new name. In some implementations, when generating the final data with the new name and including the pre-log data, the UE data, the decoded RRC messages, the marker data, and the test case data, the preprocessing system may combine the pre-log data, the UE data, the decoded RRC messages, the marker data, and the test case data to generate the final data, and the preprocessing system may assign the new name to the final data.

In some implementations, the final data may include a data structure with a file name identifier column, a verdict column, a quantity of UEs column, and/or the like. The file name identifier column may include entries for renamed filenames of a batch (or a mini-batch) of the software logs processed by the preprocessing system, as described above. This may enable other columns within a file to be readily cross-referenced with an associated cleaned file in an output storage location (e.g., a data structure). The verdict column may include entries for binary values (e.g., "1" for Pass or "0" for Fail) indicating whether a software log was associated with a pass test case or a failure test case (e.g., "PASS: The test ran successfully and passed" or "FAIL: The test ran to completion, test conditions not met"). The quantity of UEs columns may include entries that associate the quantity of UEs data for validation purposes. For example, if an objective is to extract single UE cases and perform the pre-processing tasks on the single UEs, the quantity of UEs column may include a value of one.

In some implementations, the preprocessing system may scan the software logs line by line to perform the processing described above. The preprocessing system may calculate progress of the processing and may provide for display information indicating percent completion of the processing by the preprocessing system. The preprocessing system may calculate and record a time taken to complete the processing tasks on each file. By so doing, the preprocessing system may perform statistical analysis for future improvement of the preprocessing system. For example, the preprocessing system may calculate an expected time period to process a file with a particular length. This may enable the preprocessing system to predict how long it will take for the preprocessing system to complete the processing for all of the software logs. The preprocessing system may utilize statistical models with the time calculations to identify outliers that required an abnormal amount of time and resources from the preprocessing system. Such outliers may be investigated in order to improve an efficiency and a processing speed of the preprocessing system.

In some implementations, the preprocessing system may generate a file that includes data identifying a start time when the preprocessing system started processing, an end time when the preprocessing system finished processing, a release path with a version that specifies a path of the service provider data structure associated with the software logs, a test case identifier and an associated processing time, and/or the like.

In some implementations, for verification purposes, the preprocessing system may crosscheck the cleaned software log data files against the final data. By so doing, the preprocessing system may ensure that the files to be stored at a final storage location are associated with a correct quantity of UEs as set forth in the final data.

Figure 1G:
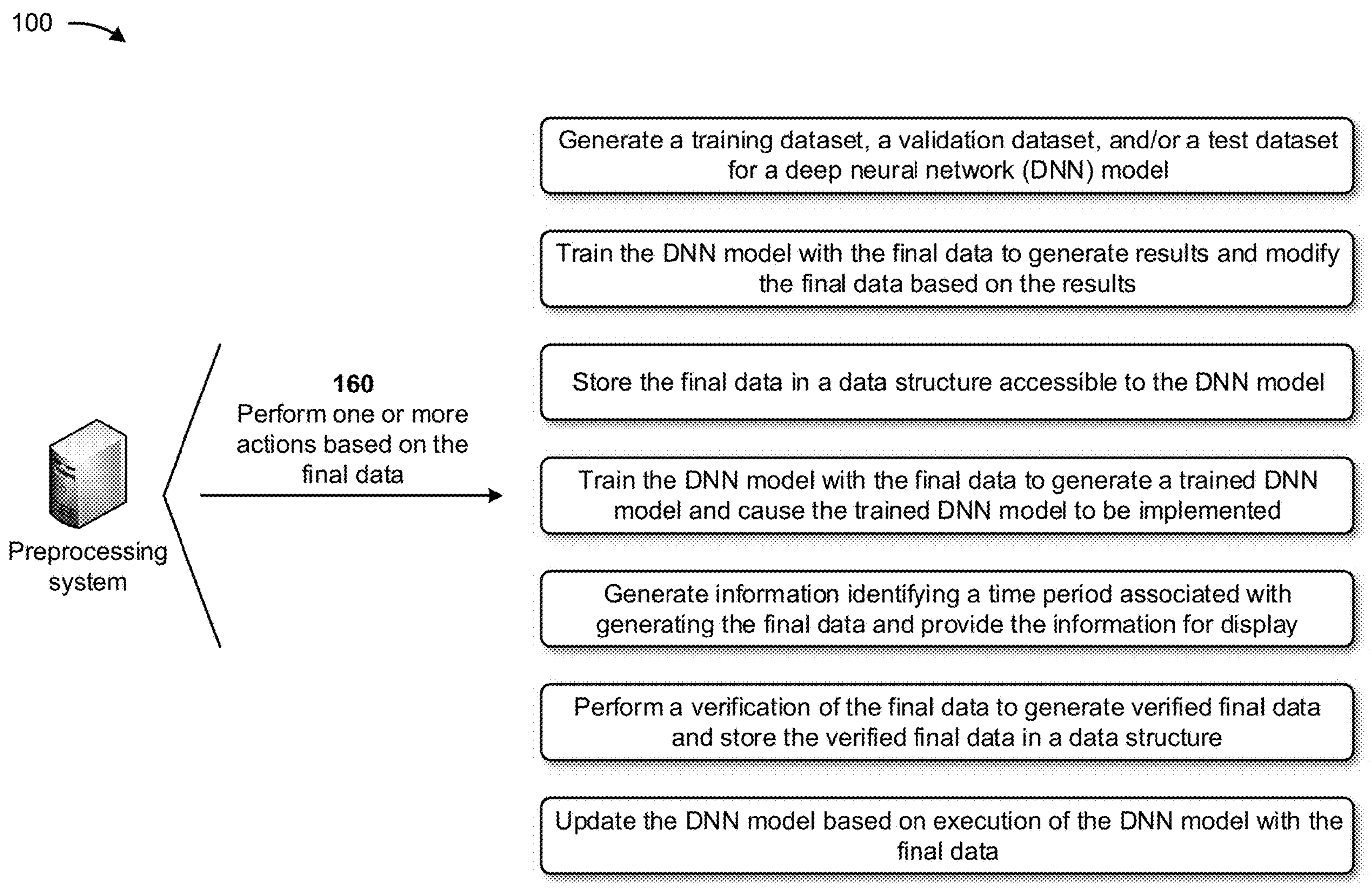

As shown in FIG. 1G, and by reference number 160, the preprocessing system may perform one or more actions based on the final data. In some implementations, performing the one or more actions includes generating a training dataset, a validation dataset, and/or a test dataset for a DNN model. For example, the preprocessing system may generate the training dataset, the validation dataset, and/or the test dataset for the DNN model based on the final data. The DNN model may train, validate, and/or test the DNN model based on the training dataset, the validation dataset, and/or the test dataset, respectively. In this way, the preprocessing system conserves computing resources, networking resources, and/or the like that would otherwise have been consumed in incorrectly training, validating, and/or testing the DNN model, making incorrect modifications to the telecommunications network based incorrect predictions from the DNN model, correcting the incorrect modifications to the telecommunications network, and/or the like.

In some implementations, performing the one or more actions includes the preprocessing system training the DNN model with the final data to generate results and modifying the final data based on the results. For example, the preprocessing system may train the DNN model with the final data, and the DNN model may produce predictions (e.g., results) based on training the DNN model. The preprocessing system may utilize the predictions to modify and improve the final data. In this way, the preprocessing system conserves computing resources, networking resources, and/or the like that would otherwise have been consumed in incorrectly training the DNN model, making incorrect modifications to the telecommunications network based incorrect predictions from the incorrectly trained DNN model, correcting the incorrect modifications to the telecommunications network, and/or the like.

In some implementations, performing the one or more actions includes the preprocessing system storing the final data in a data structure accessible to the DNN model. For example, the preprocessing system may store the final data in a data structure so that the DNN model may access and utilize the final data to train, validate, and/or test the DNN model. In this way, the preprocessing system conserves computing resources, networking resources, and/or the like that would otherwise have been consumed in incorrectly training, validating, and/or testing the DNN model, making incorrect modifications to the telecommunications network based incorrect predictions from the DNN model, and/or the like.

In some implementations, performing the one or more actions includes the preprocessing system training the DNN model with the final data to generate a trained DNN model and causing the trained DNN model to be implemented. For example, the preprocessing system may train the DNN model with the final data and may utilize the trained DNN model to make predictions associated with the telecommunications network, such as predicted modifications to the telecommunications network. In this way, the preprocessing system conserves computing resources, networking resources, and/or the like that would otherwise have been consumed in incorrectly training the DNN model, making incorrect modifications to the telecommunications network based incorrect predictions from the incorrectly trained DNN model, and/or the like.

In some implementations, performing the one or more actions includes the preprocessing system generating information identifying a time period associated with generating the final data and provide the information for display. For example, the preprocessing system may calculate progress of the processing and may provide for display information indicating percent completion of the processing by the preprocessing system. The preprocessing system may calculate and record a time taken to complete the processing tasks on each file and may provide this information identifying the time taken for display. In this way, the preprocessing system conserves computing resources, networking resources, and/or the like that would otherwise have been consumed in processing the software logs for an inordinate quantity of time, generating incorrect final data based on the processing of the software logs, and/or the like.

In some implementations, performing the one or more actions includes the preprocessing system performing a verification of the final data to generate verified final data and store the verified final data in a data structure. For example, for verification purposes, the preprocessing system may crosscheck the cleaned software log data files against the final data. By so doing, the preprocessing system may ensure that the files to be stored at a final storage location are associated with a correct quantity of UEs as set forth in the final data. The preprocessing system may store the verified final data in a data structure accessible to the DNN model. In this way, the preprocessing system conserves computing resources, networking resources, and/or the like that would otherwise have been consumed in incorrectly analyzing the software logs, making incorrect modifications to the telecommunications network based on the incorrectly analyzed software logs, correcting the incorrect modifications to the telecommunications network, and/or the like.

In some implementations, performing the one or more actions includes the preprocessing system updating the DNN model based on execution of the DNN model with the final data and generation of results. For example, the preprocessing system may process the final data with the DNN model to generate predictions. The preprocessing system may determine that the predictions are incorrect and may modify or update the DNN model based on the incorrect predictions. In this way, the preprocessing system conserves computing resources, networking resources, and/or the like that would otherwise have been consumed in incorrectly training the DNN model, making incorrect modifications to the telecommunications network based incorrect predictions from the incorrectly trained DNN model, correcting the incorrect modifications to the telecommunications network, and/or the like.

Figure 1H:
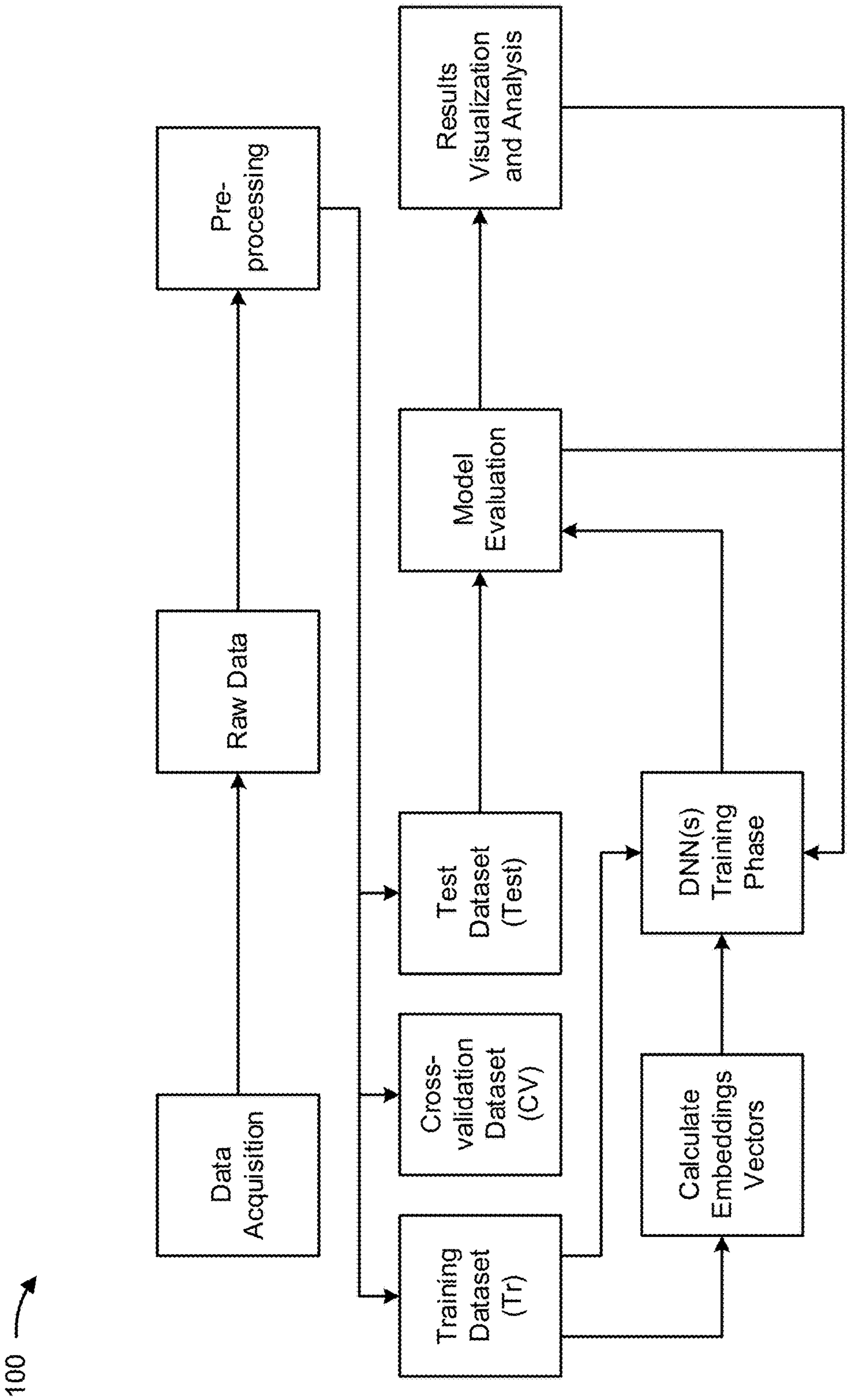

FIG. 1H is a diagram depicting a workflow for generating training data, validation data, and test data for a machine learning model, such as the DNN model. As shown, the software logs identifying the raw data generated by the telecommunications network may be acquired (e.g., via data acquisition) by the preprocessing system from the service provider data structure. The preprocessing system may process the software logs to generate the final data, as described above, and may create a training dataset (Tr), a cross-validation dataset (CV), and a test dataset (Test) based on the final data. The training dataset may be utilized to calculate embedding vectors for the DNN model. The embedding vectors and the training dataset may be utilized during a training phase of the DNN model and to generate a trained DNN model. The cross-validation dataset and the test dataset may be utilized to evaluate the trained DNN model and to generate results and analysis. A visualization of the results and the analysis may be provided for display. The results and the analysis may also be utilized to retrain the trained DNN model.

Figure 1I:
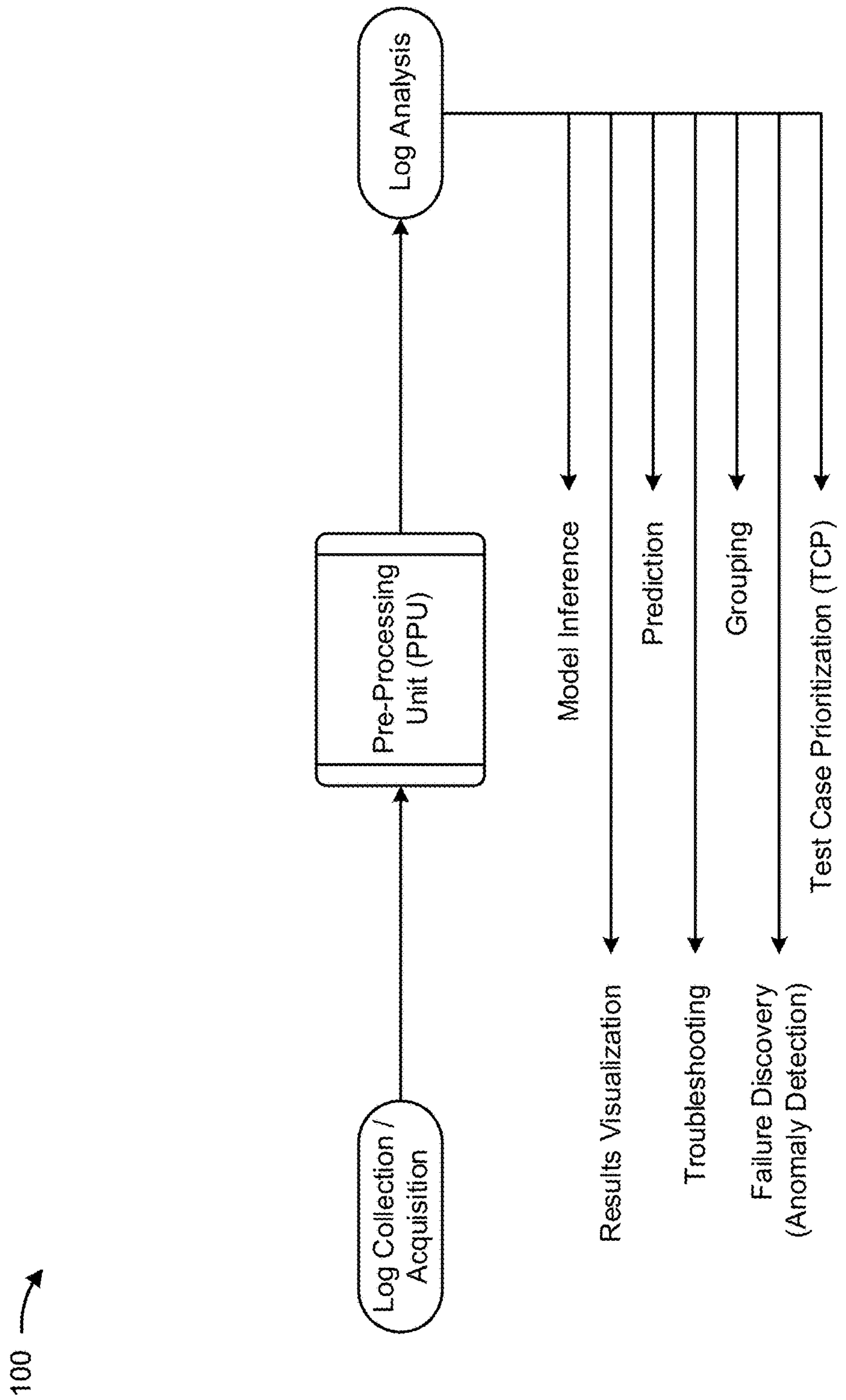

FIG. 1I is a diagram depicting a software log mining pipeline of the preprocessing system (e.g., referred to as a pre-processing unit (PPU)). As shown, the software logs identifying the raw data generated by the telecommunications network may be collected and/or acquired by the preprocessing system from the service provider data structure. The preprocessing system may process the software logs to generate a log analysis of the software logs (e.g., the final data). The log analysis may be utilized, by the DNN model, to make inferences, to generate the visualization of the results, to predict results, to troubleshoot the telecommunications network, to group identified issues associated with the telecommunications network, to aid in failure discovery (e.g., anomaly detection) associated with the telecommunications network, to prioritize test cases, and/or the like.

Figure 1J:
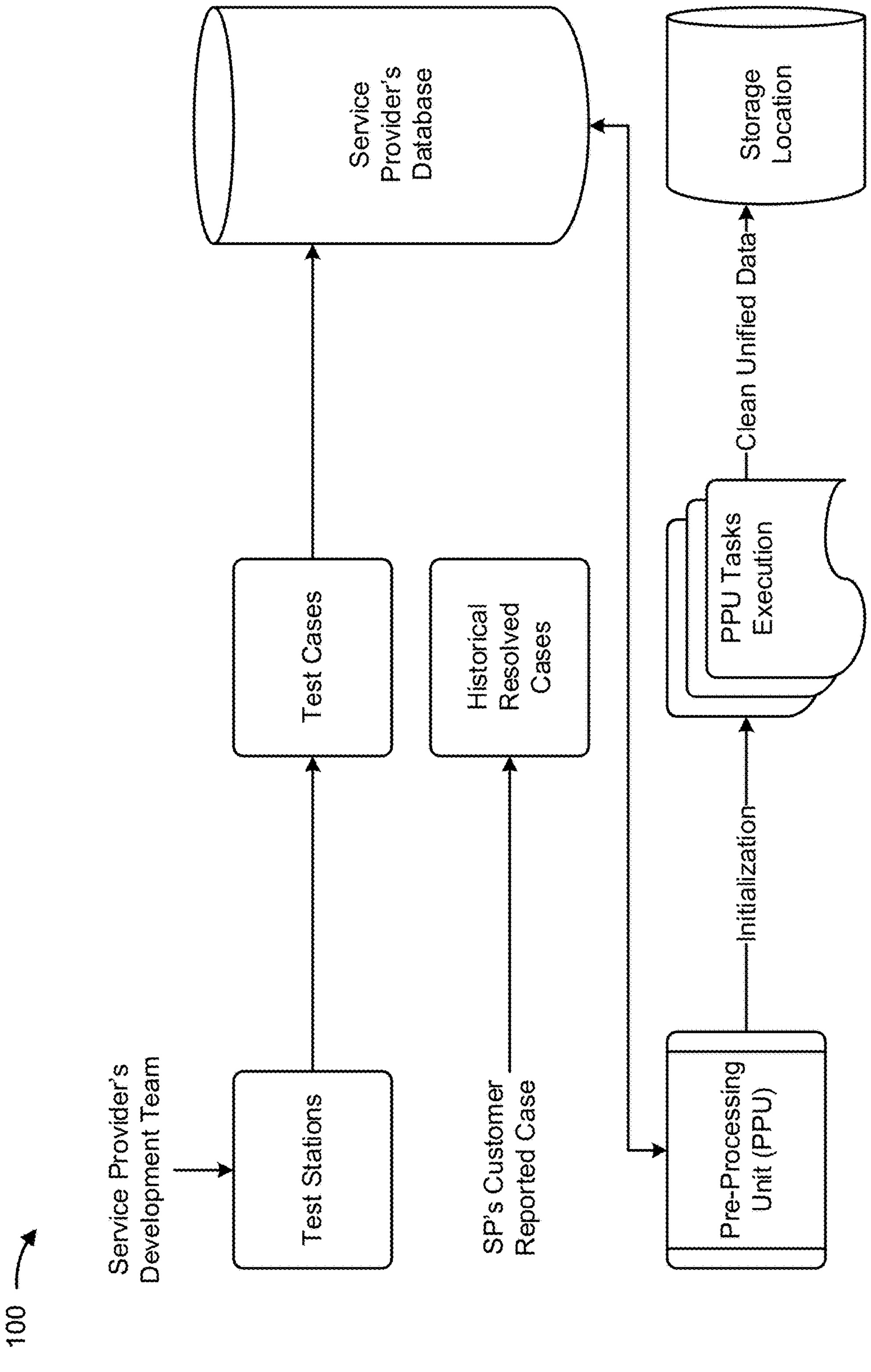

FIG. 1J is a diagram depicting a pipeline for the preprocessing system. As shown, a development team of the service provider may provide, to test stations, inputs for performing tests on the telecommunications network. The test stations may perform the tests and may generate test cases (e.g., the software logs) based on performing the tests. The test stations may store the test cases in the service provider's database. The preprocessing system may receive the test cases from the service provider's database and may be initialized. Upon initialization, the preprocessing system may execute (e.g., on the test cases) the processing tasks described above to generate clean unified data (e.g., the final data) from the test cases. The preprocessing system may store the clean unified data in a storage location (e.g., a data structure separate from the service provider's database but accessible by the DNN model).

In this way, the preprocessing system cleans raw data generated by a telecommunications network for deployment in a deep neural network model. The preprocessing system may preprocess raw data from software logs acquired from testing a telecommunications network. The preprocessing system may extract the software logs from a service provider's database and may perform batch preprocessing tasks to generate output data to be utilized by a deep neural network model. The output data may include unified clean data significantly and positively impact performance of the deep neural network during training, testing, and deployment. The preprocessing system may handle different sizes of data, different quantities of data batches, and increasing volume of software log data. The preprocessing system may also be modified to produce different categories of clean data. This, in turn, conserves computing resources, networking resources, and/or the like that would otherwise have been consumed in incorrectly analyzing the software logs, making incorrect modifications to the telecommunications network based on the incorrectly analyzed software logs, correcting the incorrect modifications to the telecommunications network, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
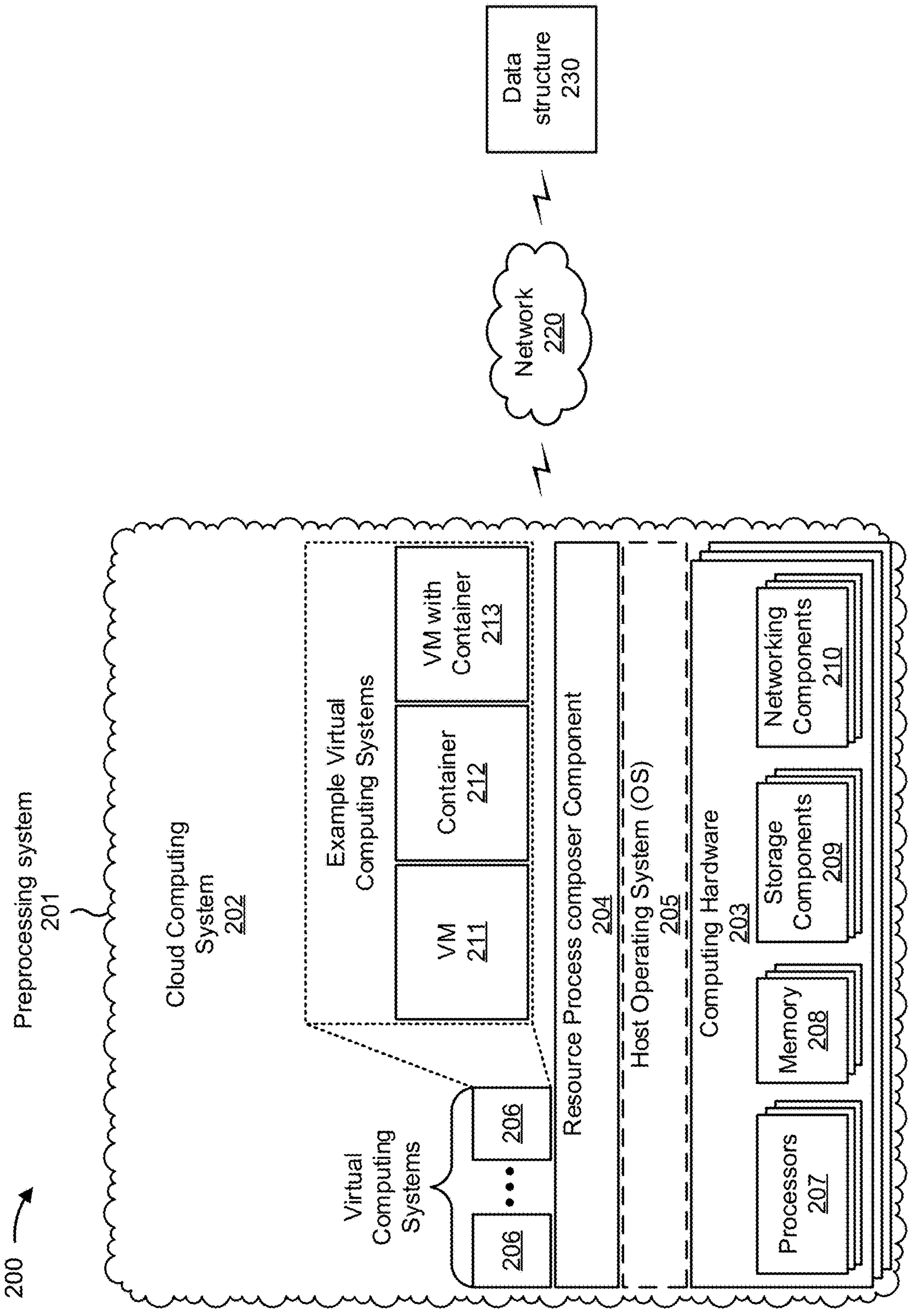
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a preprocessing system 201, which may include one or more elements of and/or may execute within a cloud computing system 202. The cloud computing system 202 may include one or more elements 203-213, as described in more detail below. As further shown in FIG. 2, the environment 200 may include a network 220 and/or a data structure 230. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, the virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the preprocessing system 201 may include one or more elements 203-213 of the cloud computing system 202, may execute within the cloud computing system 202, and/or may be hosted within the cloud computing system 202, in some implementations, the preprocessing system 201 may not be cloud-based (e.g., may be implemented outside of a cloud computing system) or may be partially cloud-based. For example, the preprocessing system 201 may include one or more devices that are not part of the cloud computing system 202, such as a device 300 of FIG. 3, which may include a standalone server or another type of computing device. The preprocessing system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The data structure 230 includes one or more devices capable of receiving, generating, storing, processing, and/or providing information, as described elsewhere herein. The data structure 230 may include a communication device and/or a computing device. For example, the data structure 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 230 may communicate with one or more other devices of the environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
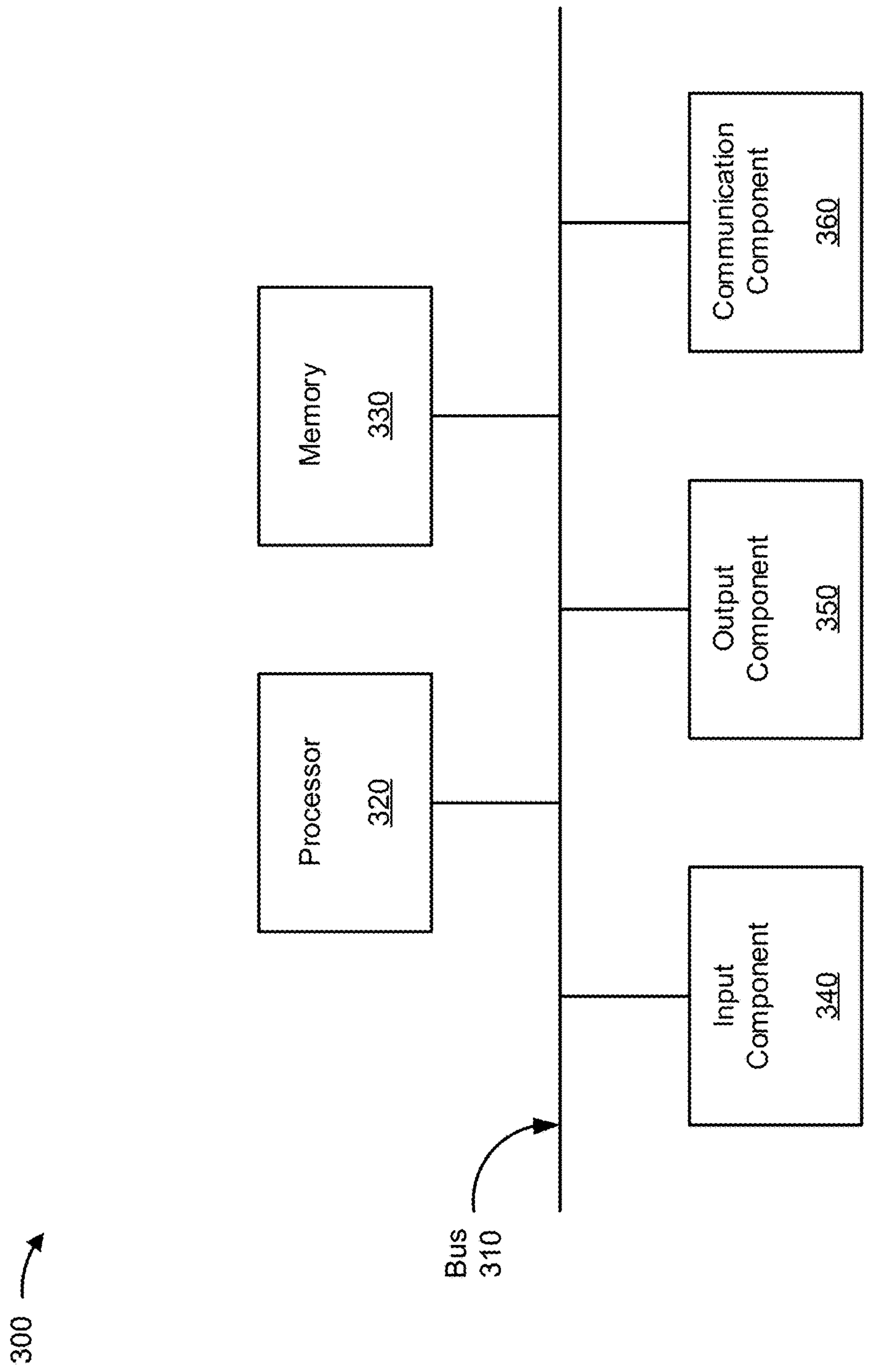
FIG. 3 is a diagram of example components of one or more devices of FIG. 2.

FIG. 3 is a diagram of example components of a device 300, which may correspond to the preprocessing system 201. In some implementations, the preprocessing system 201 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
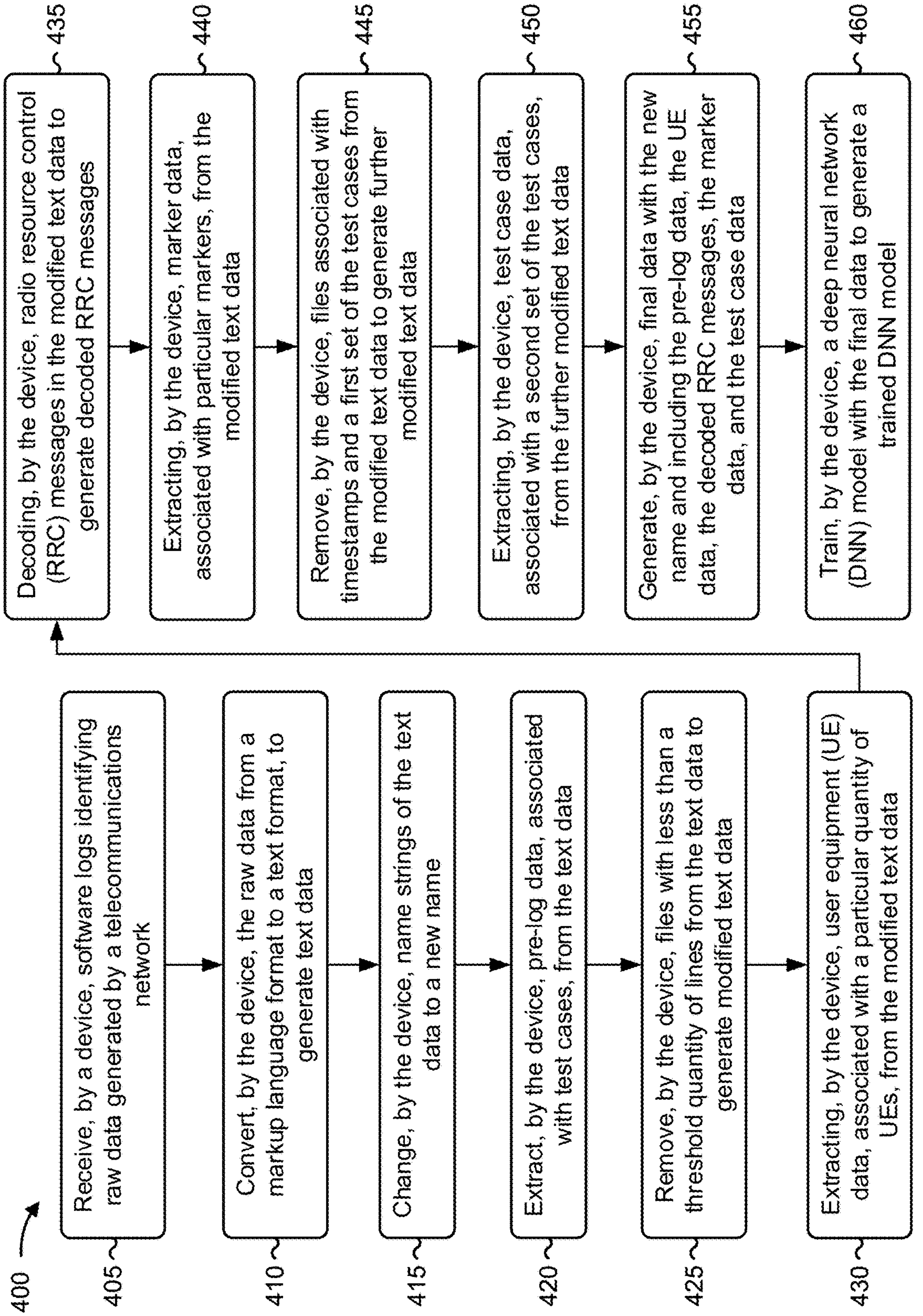
FIG. 4 is a flowchart of an example process for cleaning raw data generated by a telecommunications network for deployment in a deep neural network model.

FIG. 4 is a flowchart of an example process 400 for cleaning raw data generated by a telecommunications network for deployment in a deep neural network model. In some implementations, one or more process blocks of FIG. 4 may be performed by a device (e.g., the preprocessing system 201). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication interface 360.

As shown in FIG. 4, process 400 may include receiving software logs identifying raw data generated by a telecommunications network (block 405). For example, the device may receive software logs identifying raw data generated by a telecommunications network, as described above.

As further shown in FIG. 4, process 400 may include converting the raw data from a markup language format to a text format, to generate text data (block 410). For example, the device may convert the raw data from a markup language format to a text format, to generate text data, as described above.

As further shown in FIG. 4, process 400 may include changing name strings of the text data to a new name (block 415). For example, the device may change name strings of the text data to a new name, as described above. In some implementations, changing the name strings of the text data to the new name includes changing the name strings of the files of the text data to the new name, and storing the new name.

As further shown in FIG. 4, process 400 may include extracting pre-log data, associated with test cases, from the text data (block 420). For example, the device may extract pre-log data, associated with test cases, from the text data, as described above. In some implementations, the pre-log data includes information to be utilized for analysis tasks by the DNN model.

As further shown in FIG. 4, process 400 may include removing files with less than a threshold quantity of lines from the text data to generate modified text data (block 425). For example, the device may remove files with less than a threshold quantity of lines from the text data to generate modified text data, as described above. In some implementations, the files with less than the threshold quantity of lines include files associated with one or more of outliers, aborted executions, or faulty codes.

As further shown in FIG. 4, process 400 may include extracting UE data, associated with a particular quantity of UEs, from the modified text data (block 430). For example, the device may extract UE data, associated with a particular quantity of UEs, from the modified text data, as described above.

As further shown in FIG. 4, process 400 may include decoding RRC messages in the modified text data to generate decoded RRC messages (block 435). For example, the device may decode RRC messages in the modified text data to generate decoded RRC messages, as described above. In some implementations, decoding the RRC messages in the modified text data to generate the decoded RRC messages includes identifying a decoder executable file in the modified text data, and utilizing the decoder executable file to decode the RRC messages in the modified text data to generate the decoded RRC messages.

As further shown in FIG. 4, process 400 may include extracting marker data, associated with particular markers, from the modified text data (block 440). For example, the device may extract marker data, associated with particular markers, from the modified text data, as described above. In some implementations, the marker data includes data provided between the particular markers and the particular markers include one or more of a request marker, a response marker, a test file marker, or an RRC cell selection marker.

As further shown in FIG. 4, process 400 may include removing files associated with timestamps and a first set of the test cases from the modified text data to generate further modified text data (block 445). For example, the device may remove files associated with timestamps and a first set of the test cases from the modified text data to generate further modified text data, as described above. In some implementations, removing the files associated with the timestamps and the first set of the test cases from the modified text data to generate the further modified text data includes removing files associated with timestamps of event occurrences from the modified text data; removing test cases, associated with particular keywords, from the modified text data; and removing forbidden test cases from the modified text data, wherein the first set of the test cases includes the test cases associated with the particular keywords and the forbidden test cases.

As further shown in FIG. 4, process 400 may include extracting test case data, associated with a second set of the test cases, from the further modified text data (block 450). For example, the device may extract test case data, associated with a second set of the test cases, from the further modified text data, as described above. In some implementations, the second set of the test cases include test cases associated with non-access stratum modes and millimeter-wave transceiver system modes.

As further shown in FIG. 4, process 400 may include generating final data with the new name and including the pre-log data, the UE data, the decoded RRC messages, the marker data, and the test case data (block 455). For example, the device may generate final data with the new name and including the pre-log data, the UE data, the decoded RRC messages, the marker data, and the test case data, as described above. In some implementations, generating the final data with the new name and including the pre-log data, the UE data, the decoded RRC messages, the marker data, and the test case data includes combining the pre-log data, the UE data, the decoded RRC messages, the marker data, and the test case data to generate the final data.

As further shown in FIG. 4, process 400 may include training a DNN model with the final data to generate a trained DNN model (block 460). For example, the device may train a DNN model with the final data to generate a trained DNN model, as described above.

In some implementations, process 400 includes removing delimiters from the further modified text data. In some implementations, process 400 includes causing the trained DNN model to be implemented.

In some implementations, process 400 includes one or more of generating a training dataset, a validation dataset, and a test dataset for the DNN model; training the DNN model with the final data to generate results and modifying the final data based on the results; storing the final data in a data structure accessible to the DNN model; generating information identifying a time period associated with generating the final data and providing the information for display; or performing a verification of the final data to generate verified final data and storing the verified final data in a data structure accessible to the DNN model.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system, comprising:

one or more memories; and one or more processors, coupled to the one or more memories, configured to cause the system to:

receive logs identifying raw data generated by a telecommunications network;

generate text data based on the raw data;

generate decoded Layer 3 (L3) messages based on L3 messages that are in the text data, are associated with a network layer protocol, and include information used to train a deep neural network (DNN) model to perform a particular task;

generate final data with the decoded L3 messages; and one or more of:

generate, based on the final data, one or more of a training dataset, a validation dataset, or a test dataset for the DNN model, train the DNN model with the final data, or update the DNN model based on an execution of the DNN model with the final data.

2. The system of claim 1, wherein the one or more processors are further configured to cause the system to:

record a time taken to complete processing tasks on the raw data; and perform, based on the time, statistical analysis for future improvement of the system.

3. The system of claim 2, wherein, to perform the statistical analysis, the one or more processors are configured to cause the system to one or more of:

calculate, based on the time, an expected time period to process a file with a particular length, or identify, based on the time, one or more outliers that require one or more of an abnormal amount of time or resources from the system.

4. The system of claim 1, wherein the one or more processors are further configured to cause the system to:

generate, for the logs, a file that includes data identifying one or more of:

a start time when the system started processing, an end time when the system finished processing, a release path with a version that specifies a path of a service provider data structure associated with the logs, an associated processing time, or a test case identifier.

5. The system of claim 1, wherein the L3 messages are radio resource control (RRC) messages.

6. The system of claim 1, wherein, to generate the decoded L3 messages, the one or more processors are configured to cause the system to:

extract a protocol data unit (PDU) name and PDU codes from the L3 messages.

7. The system of claim 1, wherein the text data is modified text data, and wherein, to generate the decoded L3 messages, the one or more processors are configured to cause the system to:

identify a decoder executable file in the modified text data, and utilize the decoder executable file to decode the L3 messages, in the modified text data, to generate the decoded L3 messages.

8. The system of claim 1, wherein the one or more processors are configured to cause the system to:

train the DNN model with the final data to generate one or more of results or a trained DNN model, and one or more of:

modify the final data based on the results, or cause the trained DNN model to be implemented.

9. The system of claim 1, wherein the final data includes a data structure with a file name identifier column that includes entries for renamed filenames of a batch or a mini-batch of the logs.

10. A method, comprising:

generating, by a system, text data based on raw data generated by a telecommunications network;

generating, by the system, decoded Layer 3 (L3) messages based on L3 messages that are in the text data, are associated with a network layer protocol, and include information used to train a deep neural network (DNN) model to perform a particular task;

generating, by the system, final data with the decoded L3 messages; and one or more of:

training, by the system, the DNN model with the final data, or updating, by the system, the DNN model based on an execution of the DNN model with the final data.

11. The method of claim 10, further comprising:

recording a time taken to complete processing tasks on the raw data; and performing, based on the time, statistical analysis for future improvement of the system.

12. The method of claim 11, wherein performing the statistical analysis comprises:

calculating, based on the time, an expected time period to process a file with a particular length.

13. The method of claim 11, wherein performing the statistical analysis comprises:

identifying, based on the time, one or more outliers that require one or more of an abnormal amount of time or resources from the system.

14. The method of claim 10, further comprising:

receiving, before generating the text data, logs that identify the raw data; and generating, for the logs, a file that includes data identifying one or more of:

a release path with a version that specifies a path of a service provider data structure associated with the logs, an associated processing time, or a test case identifier.

15. The method of claim 10, wherein the L3 messages are radio resource control (RRC) messages.

16. The method of claim 10, wherein generating the decoded L3 messages comprises:

extracting a protocol data unit (PDU) name and PDU codes from the L3 messages.

17. An apparatus, comprising:

means for receiving logs identifying raw data generated by a telecommunications network;

means for generating text data based on the raw data;

means for identifying Layer 3 (L3) messages that are in the text data, are associated with a network layer protocol, and include information used to train a deep neural network (DNN) model to perform a particular task;

means for generating final data with the L3 messages; and one or more of:

means for generating, based on the final data, one or more of a training dataset, a validation dataset, or a test dataset for the DNN model, means for training the DNN model with the final data, or means for updating the DNN model based on an execution of the DNN model with the final data.

18. The apparatus of claim 17, further comprising:

means for recording a time taken to complete processing tasks on the raw data; and means for performing, based on the time, statistical analysis for future improvement of the apparatus.

19. The apparatus of claim 17, further comprising:

means for generating, for the logs, a file that includes data identifying one or more of:

a start time when the apparatus started processing, and an end time when the apparatus finished processing.

20. The apparatus of claim 17, wherein the L3 messages are radio resource control (RRC) messages.

* * * * *